US011512972B2

(12) United States Patent
Gallo et al.

(10) Patent No.: US 11,512,972 B2
(45) Date of Patent: Nov. 29, 2022

(54) SYSTEM AND METHOD FOR COMMUNICATING POSSIBLE TRAVEL PATHS THROUGH HEAD SCANNING AND SOUND MODULATION

(71) Applicant: Naver Corporation, Seongnam-si (KR)

(72) Inventors: Danilo Gallo, Grenoble (FR);
Shreepriya Shreepriya, Grenoble (FR);
Jutta Katharina Willamowski, Grenoble (FR)

(73) Assignee: Naver Corporation

( * ) Notice: Subject to any disclaimer, the term of this patent is extended or adjusted under 35 U.S.C. 154(b) by 363 days.

(21) Appl. No.: 16/592,943

(22) Filed: Oct. 4, 2019

(65) Prior Publication Data

US 2021/0102819 A1 Apr. 8, 2021

(51) Int. Cl.
*G01C 21/36* (2006.01)
*G08B 7/06* (2006.01)

(52) U.S. Cl.
CPC ..... *G01C 21/3629* (2013.01); *G01C 21/3652* (2013.01); *G08B 7/06* (2013.01)

(58) Field of Classification Search
CPC ................................................ G01C 21/3629
See application file for complete search history.

(56) References Cited

U.S. PATENT DOCUMENTS

| | | | | |
|---|---|---|---|---|
| 8,442,791 B2* | 5/2013 | Stahlin | ..................... | H04L 67/12 702/94 |
| 9,766,626 B1* | 9/2017 | Zhu | ..................... | G08G 1/166 |
| 10,421,453 B1* | 9/2019 | Ferguson | .......... | B60W 60/0027 |
| 10,545,584 B2* | 1/2020 | Tome | ................... | G06F 3/03547 |
| 10,569,708 B2* | 2/2020 | Rowell | ................... | B60Q 1/525 |

(Continued)

FOREIGN PATENT DOCUMENTS

| | | | | |
|---|---|---|---|---|
| GB | 2538572 A | * | 11/2016 | ......... G06K 9/00818 |
| JP | 4957518 B2 | * | 6/2012 | |
| WO | WO-2004066240 A2 | * | 8/2004 | ........... G08G 1/0965 |

OTHER PUBLICATIONS

Google Machine Translation of 4957518 B2 Jun. 2021.*

(Continued)

*Primary Examiner* — Jean Paul Cass
(74) *Attorney, Agent, or Firm* — Michael J. Nickerson; Basch & Nickerson LLP

(57) ABSTRACT

A method and system that provides navigational related audio or haptic feedback to a user traversing a route by mapping an initial route for a user to traverse, the initial route having paths and intersections; determining a current location of the user; inputting a route characteristic change of the initial route; determining possible paths associated with an intersection for the user to traverse when the current location of the user is within the predetermined distance of the intersection; ranking the determined possible paths based upon the initial route and the inputted route characteristic change; determining the head direction of the user when the current location of the user is within the predetermined distance of an intersection; determining which of the possible paths corresponds to the calculated head direction of the user; and providing an audio/haptic cue to the user based upon the ranking of the determined possible path corresponding to the determined head direction of the user.

29 Claims, 11 Drawing Sheets

(56) References Cited

U.S. PATENT DOCUMENTS

| | | | | |
|---|---|---|---|---|
| 10,650,621 | B1* | 5/2020 | King | H04L 67/12 |
| 10,922,975 | B2* | 2/2021 | Kim | B60Q 5/005 |
| 11,039,075 | B1* | 6/2021 | Almehmadi | G06F 3/16 |
| 2010/0057571 | A1 | 3/2010 | Yamamoto et al. | |
| 2012/0185136 | A1 | 7/2012 | Boschker et al. | |
| 2014/0107916 | A1 | 4/2014 | Urup et al. | |
| 2014/0306814 | A1* | 10/2014 | Ricci | A61B 5/7405 |
| | | | | 340/425.5 |
| 2016/0342850 | A1* | 11/2016 | Elimalech | B60R 1/00 |
| 2019/0038190 | A1* | 2/2019 | Zhong | A61B 5/1477 |

OTHER PUBLICATIONS

Ahmaniemi, Teemu Tuomas, and Vuokko Tuulikki Lantz. 'Augmented Reality Target Finding Based on Tactile Cues'. In Proceedings of the 2009 International Conference on Multimodal Interfaces—ICMI-MLMI '09, 335. Cambridge, Massachusetts, USA: ACM Press, 2009. https://doi.org/10.1145/1647314.1647383. 2009.

Etter, Richard, and Marcus Specht. 'Melodious Walkabout: Implicit Navigation With Contextualized Personal Audio Contents', n.d., 5. 2018 2018.

Giannopoulos, Ioannis, Peter Kiefer, and Martin Raubal. 'GazeNav: Gaze-Based Pedestrian Navigation'. In Proceedings of the 17th International Conference on Human-Computer Interaction with Mobile Devices and Services—MobileHCI '15, 337-46. Copenhagen, Denmark: ACM Press, 2015. https://doi.org/10.1145/2785830.2785873. 2015.

Holland, Simon, David R. Morse, and Henrik Gedenryd. 'AudioGPS: Spatial Audio Navigation with a Minimal Attention Interface'. Personal and Ubiquitous Computing 6, No. 4 (Sep. 1, 2002): 253-59. https://doi.org/10.1007/s007790200025. 2002.

Jylhä, Antti, Yi-Ta Hsieh, Valeria Orso, Salvatore Andolina, Luciano Gamberini, and Giulio Jacucci. 'A Wearable Multimodal Interface for Exploring Urban Points of Interest'. In Proceedings of the 2015 ACM on International Conference on Multimodal Interaction—ICMI '15, 175-82. Seattle, Washington, USA: ACM Press, 2015. https://doi.org/10.1145/2818346.2820763. 2015.

Komninos, Andreas, Peter Barrie, Vassilios Stefanis, and Athanasios Plessas. 'Urban Exploration Using Audio Scents'. In Proceedings of the 14th International Conference on Human-Computer Interaction with Mobile Devices and Services—MobileHCI '12, 349. San Francisco, California, USA: ACM Press, 2012. 2012.

Liljedahl, Mats, and Stefan Lindberg. 'Sound Parameters for Expressing Geographic Distance in a Mobile Navigation Application'. In Proceedings of the 6th Audio Mostly Conference on A Conference on Interaction with Sound—AM '11, 1-7. Coimbra, Portugal: ACM Press, 2011. https://doi.org/10.1145/2095667.2095668. 2011.

McGookin, David, Stephen Brewster, and Pablo Priego. 'Audio Bubbles: Employing Non-Speech Audio to Support Tourist Wayfinding'. In Haptic and Audio Interaction Design, edited by M. Ercan Altinsoy, Ute Jekosch, and Stephen Brewster, 5763:41-50. Berlin, Heidelberg: Springer Berlin Heidelberg, 2009. https://doi.org/10.1007/978-3-642-04076-4_5. 2009.

McGookin, David K., and Stephen A. Brewster. 'Investigating and Supporting Undirected Navigation for Runners'. In CHI '13 Extended Abstracts on Human Factors in Computing Systems on—CHI EA '13, 1395. Paris, France: ACM Press, 2013. https://doi.org/10.1145/2468356.2468605. 2013.

Rantala, Jussi, Jari Kangas, and Roope Raisamo. 'Directional Cueing of Gaze with a Vibrotactite Headband'. In Proceedings of the 8th Augmented Human International Conference on—AH '17, 1-7. Silicon Valley, California: ACM Press. 2017. https://doi.org/10.1145/3041164.3041176. 2017.

Robinson, Simon, Matt Jones, Parisa Eslambolchilar, Roderick Murray-Smith, and Mads Lindborg. '"I Did It My Way": Moving Away from the Tyranny of Turn-by-Turn Pedestrian Navigation'. In Proceedings of the 12th International Conference on Human Computer Interaction with Mobile Devices and Services—MobileHCI '10, 341. Lisbon, Portugal: ACM Press, 2010. https://doi.org/10.1145/1851600.1851660. 2010.

Strachan, Steven, Parisa Eslambolchilar, Roderick Murray-Smith, Stephen Hughes, and Sile O'Modhrain. 'GpsTunes: Controlling Navigation via Audio Feedback'. In Proceedings of the 7th International Conference on Human Computer Interaction with Mobile Devices & Services, 275-278. MobileHCI '05. New York, NY, USA: ACM, 2005. https://doi.org/10.1145/1085777.1085831. 2005.

Warren, Nigel, Matt Jones, Steve Jones, and David Bainbridge. 'Navigation via Continuously Adapted Music'. In CHI '05 Extended Abstracts on Human Factors in Computing Systems—CHI '05, 1849. Portland, OR, USA: ACM Press, 2005. https://doi.org/10.1145/1056808.1057038. 2005.

* cited by examiner

SYSTEM AND METHOD FOR COMMUNICATING POSSIBLE TRAVEL PATHS THROUGH HEAD SCANNING AND SOUND MODULATION

BACKGROUND

Conventional navigation support for pedestrians, runners, and/or cyclists includes visual, haptic, and/or auditory navigation support.

A problem associated with conventional navigational systems utilizing visual support is that the user is required to explicitly look at the navigational device. Even if the visual navigational support is provided via a smart watch, the visual navigational support still requires the runner, pedestrian, and/or cyclist to perform intentional arm movements to put the smart watch into a position so that the information being provided by the smart watch can be visually perceived.

Conventional navigational systems utilizing haptic cues are less intrusive than visual ones. However, haptic cues can be easily missed or misunderstood.

Conventional navigational systems utilizing audio navigational support have the advantage of freeing the users from having to look at mobile screens and reduce cognitive load to understand complex vibro-tactile cues. Most of them use voice-based turn-by-turn directions.

Some conventional audio navigational systems utilize sound modulation, modifying stereo properties, to encode the overall bearing direction towards a target location, and the sound volume to encode the current distance from that location. Such conventional audio navigational systems attract the user towards a target location.

An example of a conventional audio navigational system is described in Published US Patent Application Number 2010/0057571. The entire content of Published US Patent Application Number 2010/0057571 is hereby incorporated by reference.

Published US Patent Application Number 2010/0057571 describes a portable information terminal that includes: a position detecting section that detects a position of the portable information terminal; a selecting section that selects a guidance target object for which voice guidance is to be provided, and detects a guidance target direction that is a direction in which the guidance target object exists with respect to a reference direction, on the basis of a direction in which the guidance target object exists with respect to the position of the portable information terminal; a voice synthesis section that generates a synthetic voice so that a guidance voice for the guidance target object selected by the selecting section is heard from the guidance target direction; and a voice output section that outputs the synthetic voice generated by the voice synthesis section.

Another example of a conventional audio navigational system is described in Published US Patent Application Number 2012/0185163. The entire content of Published US Patent Application Number 2012/0185163 is hereby incorporated by reference.

Published US Patent Application Number 2012/0185163 describes determining an initial route from the start location to the destination location, and setting the initial route as a current route; determining for each attractor in a candidate set of attractors, a relative attraction value that is dependent on a distance between the attractor and the current route; determining which attractor corresponds to a largest attraction value; modifying the current route to include a deviation to the determined attractor.

A third example of a conventional audio navigational system is described in Published US Patent Application Number 2014/0107916. The entire content of Published US Patent Application Number 2014/0107916 is hereby incorporated by reference.

Published US Patent Application Number 2014/0107916 describes a navigation system that includes: a hearing device configured to be worn at a head of a user and having speakers for emission of sound towards ears of the user; a GPS unit for determining a geographical position of the system; a user interface for receiving input from the user regarding at least one of available time and maximum distance; a sound generator for outputting audio signals to the speakers; and a processor configured for determining a route between selected Points-Of-Interest, which route can be covered within the at least one of available time and maximum distance, wherein the processor is also configured for controlling the sound generator to output the audio signals for processing by the speakers to guide the user along the determined route; wherein the processor is further configured for taking information on preferred directions of approach for at least one Point-Of-Interest into account when determining the route.

With respect to the conventional navigational systems described above, the conventional navigational systems attract the user towards the one single good path option.

Also, the above described conventional navigational systems do not provide information about the quality of the path towards the desired location.

Moreover, the above described conventional navigational systems do not provide information about multiple alternative paths, wherein a characteristic of each path is conveyed to the user.

Furthermore, the above described conventional navigational systems do not provide the user the ability to scan alternative paths (directions) during exploration and get varying feedback when looking at the different options.

Additionally, the above described conventional navigational systems do not provide flexibility in selecting optional paths and guidance with respect to multiple verified good alternative paths.

Therefore, it is desirable to provide a personal navigational system that provides information with respect to the quality of the path towards the desired location.

Moreover, it is desirable to provide a personal navigational system that provides multiple alternative paths, wherein a characteristic of each path is conveyed to the user.

Furthermore, it is desirable to provide a personal navigational system that provides the user with the ability to scan alternative paths (directions) during exploration and get varying feedback when looking at the different options.

Additionally, it is desirable to provide a personal navigational system that provides flexibility in selecting optional paths and guidance with respect to multiple verified good alternative paths.

BRIEF DESCRIPTION OF THE DRAWINGS

The drawings are only for purposes of illustrating various embodiments and are not to be construed as limiting, wherein.

DETAILED DESCRIPTION OF THE DRAWING

Figure 1:
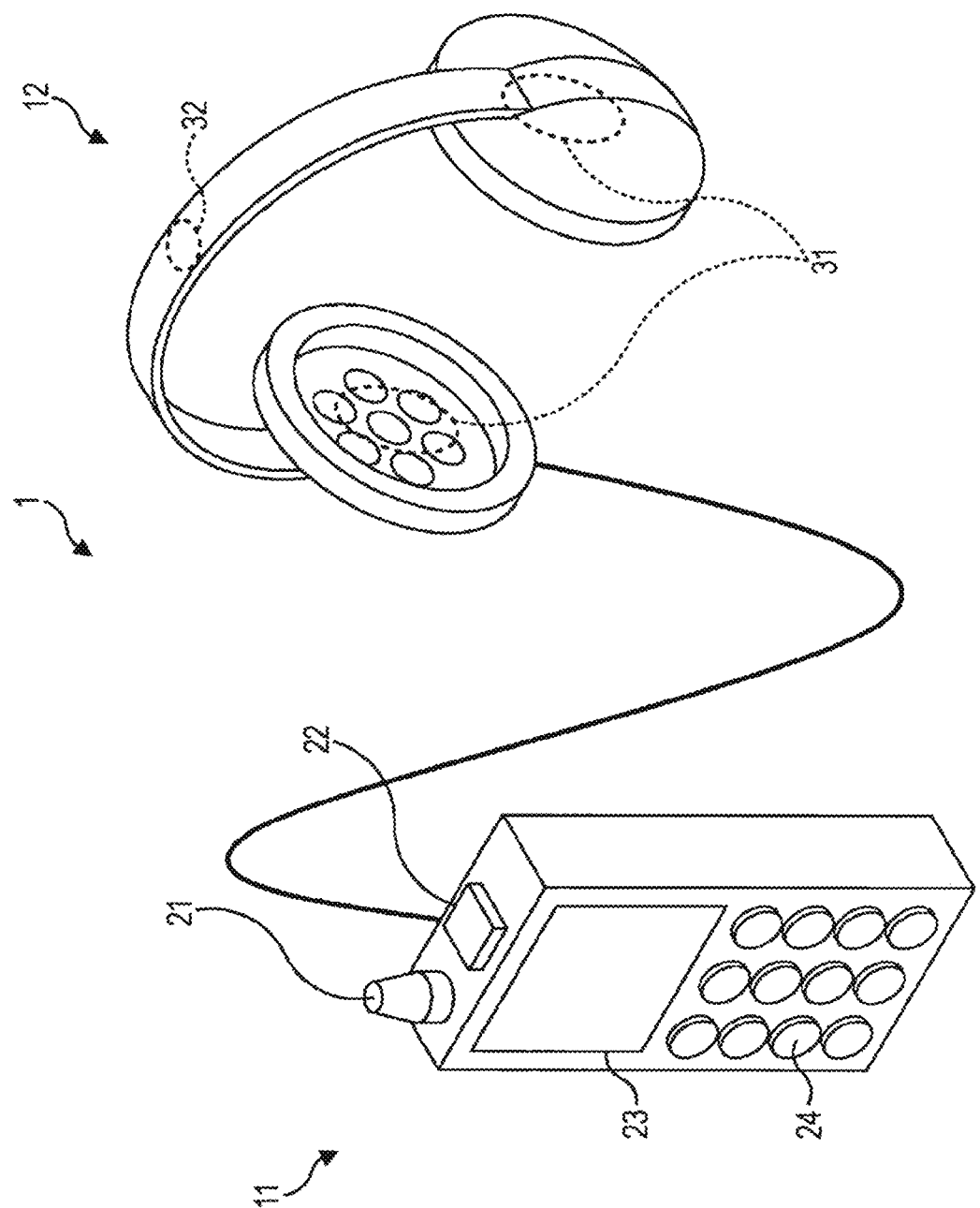
FIG. 1 illustrates an example of the outward appearance of a portable information terminal.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

FIG. 1 illustrates an example of the outward appearance of a portable information terminal. As illustrated in FIG. 1, a portable navigational system 1 includes a portable navigational device 11 and a headphone 12 connected to each other by a detachable cable.

It is noted that the portable navigational device 11 of FIG. 1 may be a smart phone, a portable personal digital assistance device, or any portable device that can provide audio output and interact with a global-positioning system (GPS) and a communication system, such as a cellular service.

It is further noted that the headphone 12 of FIG. 1 may be wirelessly connected to the portable navigational device 11. It is further noted that the headphone 12 of FIG. 1 may be a single speaker that can be worn anywhere or a single speaker within the portable navigational device 11.

The portable navigational device 11 has a wireless communication antenna 21, a GPS receiver 22, a display device 23, and buttons 24.

Figure 3:
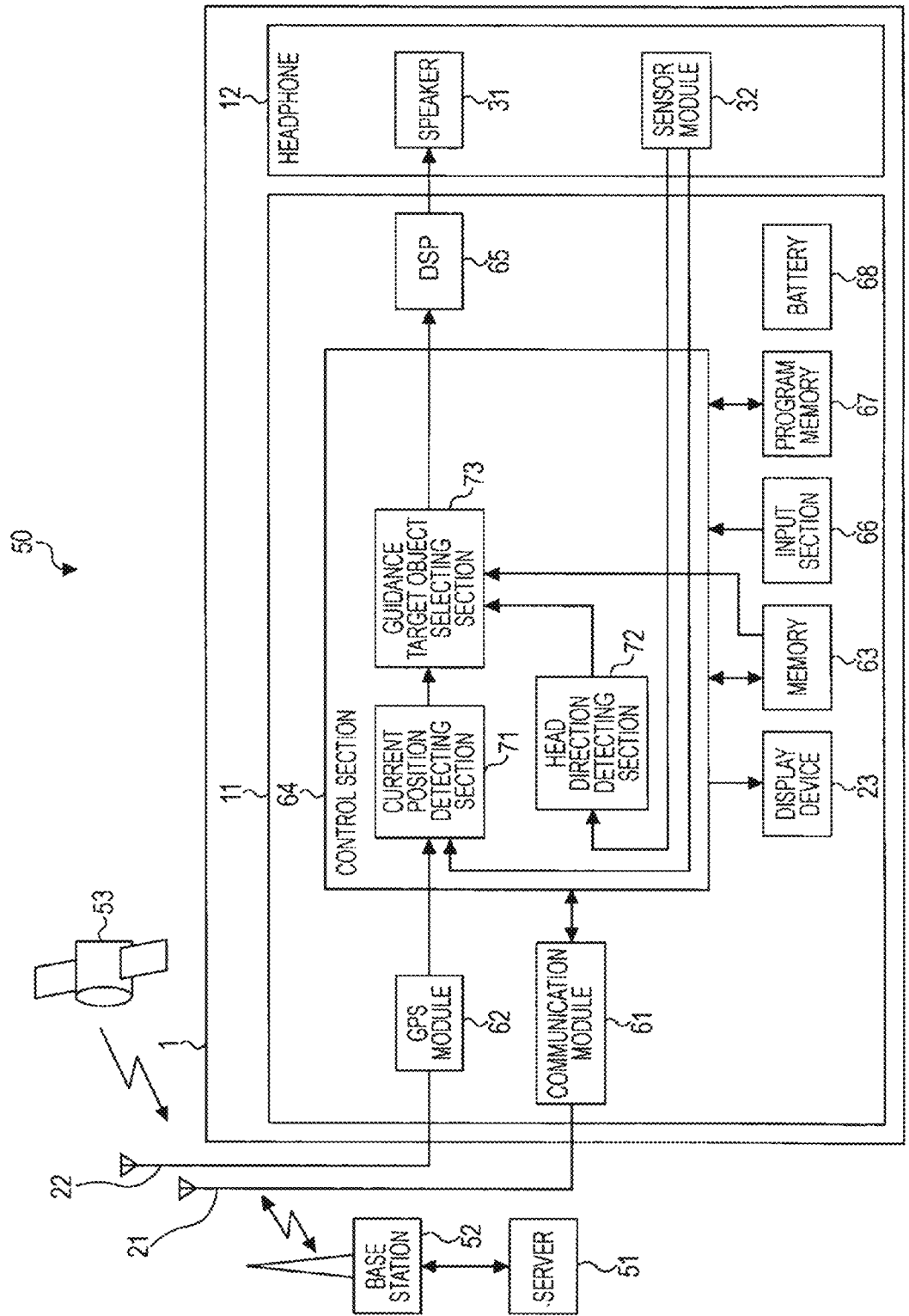
FIG. 3 illustrates an example of the configuration of an audio navigational system.

The wireless communication antenna 21 transmits and receives signals of a predetermined frequency to perform wireless communication using packets with, for example, a base station such as a base station 52 shown in FIG. 3.

The GPS receiver 22 receives, for example, a GPS signal transmitted from a GPS satellite 53 shown in FIG. 3.

The display device 23 may be formed by, for example, an LCD (Liquid Crystal Display) device or the like, and displays a GUI (Graphical User Interface) such as an input screen for inputting commands or the like, or predetermined information.

The buttons 24 are each formed by, for example, a numerical button for inputting a telephone number or the like, a button to which a predetermined command is assigned, or the like.

It is noted that the functions of the display device 23 and the buttons 24 can be combined in a single touch screen.

The headphone 12 includes two earpieces and an arm connecting between these earpieces. A speaker 31 is mounted inside each of the two earpieces, and a sensor module 32 is mounted in the interior of the center portion of the arm. Although FIG. 1 illustrates that the sensor module 32 is located in the center of the arm of the headphone 12, the sensor module 32 can be located anywhere on the headphone 12. It is further noted that the sensor module 32 does not need to be located on the headphone 12. The sensor module 32 may be a separate device that is clipped on the user's ear, or the sensor module 32 may be on a separate head-strap worn by the user.

The sensor module 32 may be formed by, for example, an acceleration sensor, an MR (Magneto Resistive) magnetic sensor, an air pressure sensor, an angular velocity (gyro) sensor, or a temperature sensor. The acceleration sensor, the MR magnetic sensor, the air pressure sensor, the angular velocity sensor, and the temperature sensor measure the vertical direction, the direction of the earth's magnetic field, the height, changes in direction, and the temperature, respectively.

Since the sensor module 32 of FIG. 1 is mounted in the interior of the center portion of the arm, with the headphone 12 worn on the head of the user, the sensor module 32 can measure the orientation in the up-down direction, orientation in the left-right direction, height and changes in orientation.

It should be noted that, in one embodiment of the sensor to track head movement, since an acceleration generated when the user suddenly moves his/her head affects the results of measurement by the acceleration sensor in the vertical direction, that is, in the up-down direction, the acceleration sensor is desirably placed at the center portion of the arm of the headphone 12 located on a rotation axis about which the user shakes his/her head to the left and right, for example.

Further, since the response speed of the magnetic sensor, in one embodiment of the sensor to track head movement, is relatively low, the direction of the earth's magnetic field as measured by the magnetic sensor is corrected by changes in direction as measured by the angular velocity sensor whose response speed is high, thereby making it possible to find the direction of the earth's magnetic field, that is, the orientation in the left-right direction more accurately.

It is further noted that, as noted above, the sensor module 32 can be located anywhere on the headphone 12; not located on the headphone 12; may be a separate device that is clipped on the user's ear; or may be on a separate head-strap worn by the user.

While FIG. 1 adopts a configuration in which the respective sensors are integrated with the sensor module 32, alternatively, a configuration may be adopted in which the respective sensors are placed individually.

Figure 2:
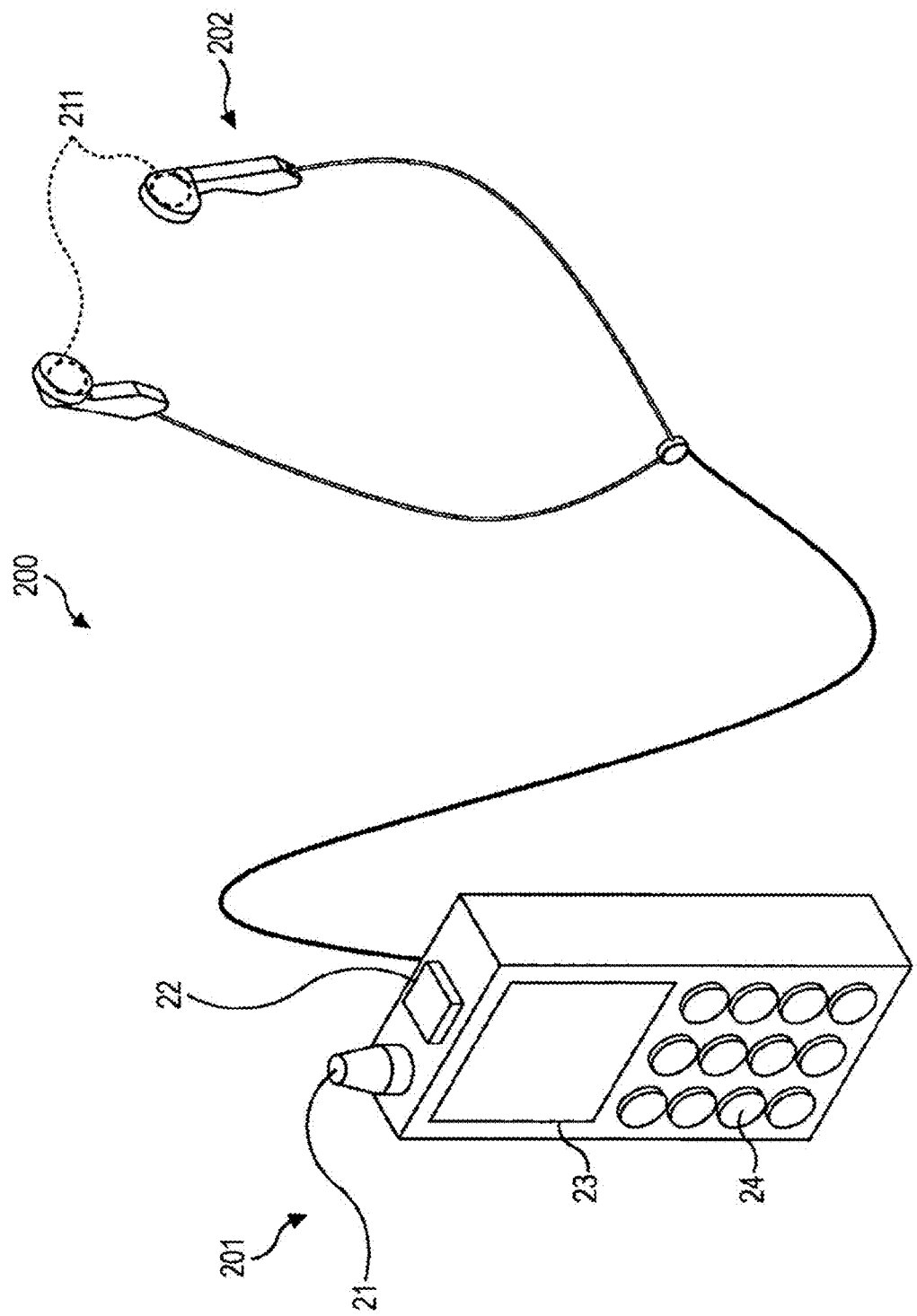
FIG. 2 illustrates another example of the outward appearance of a portable information terminal.

FIG. 2 illustrates another example of the outward appearance of a portable information terminal. As illustrated in FIG. 2, a portable navigational system 200 includes a portable navigational device 201 and earphones 202 connected to each other by a detachable cable.

It is noted that the portable navigational device 201 of FIG. 2 may be a smart phone, a portable personal digital assistance device, or any portable device that can provide audio output and interact with a global-positioning system (GPS) and/or a communication system, such as a cellular service, to enable the calculating of new targets (alternative paths).

It is further noted that the earphones 202 of FIG. 2 may be wirelessly connected to the portable navigational device 201.

The portable navigational device 201 has a wireless communication antenna 21, a GPS receiver 22, a display device 23, and buttons 24.

The wireless communication antenna 21 transmits and receives signals of a predetermined frequency to perform wireless communication using packets with, for example, a base station such as a base station 52 shown in FIG. 3.

The GPS receiver 22 receives, for example, a GPS signal transmitted from a GPS satellite 53 shown in FIG. 3.

The display device 23 may be formed by, for example, an LCD (Liquid Crystal Display) device or the like, and displays a GUI (Graphical User Interface) such as an input screen for inputting commands or the like, or predetermined information.

The buttons 24 are each formed by, for example, a numerical button for inputting a telephone number or the like, a button to which a predetermined command is assigned, or the like.

It is noted that the functions of the display device 23 and the buttons 24 can be combined in a single touch screen.

The earphones 202 includes a speaker 211 is mounted inside each of the two earpieces, and a sensor module (not shown) is mounted in the interior of one or both earpieces 202.

The sensor module may be formed by, for example, an acceleration sensor, an MR (Magneto Resistive) magnetic sensor, an air pressure sensor, an angular velocity (gyro) sensor, or a temperature sensor. The acceleration sensor, the MR magnetic sensor, the air pressure sensor, the angular velocity sensor, and the temperature sensor measure the vertical direction, the direction of the earth's magnetic field, the height, changes in direction, and the temperature, respectively.

FIG. 3 illustrates an example of the configuration of an audio navigational system. As illustrated in FIG. 3, the portable navigational device 11 accommodates a communication module 61, a GPS module 62, a memory 63, a control section 64, a DSP (Digital Signal Processor) 65, an input section 66, a program memory 67, and a battery 68, which are mounted onto a circuit board (not shown).

The communication module 61 is a communication interface between the wireless communication antenna 21 and the control section 64. The communication module 61 supplies to the control section 64 information obtained by applying predetermined processing to a signal supplied from the wireless communication antenna 21, and supplies to the wireless communication antenna 21 a signal obtained by applying predetermined processing to information supplied from the control section 64.

The GPS module 62 calculates the latitude and longitude of the portable navigational device 11 by applying predetermined processing to a GPS signal supplied from the GPS receiver 22, and supplies the calculated latitude and longitude to the control section 64.

The memory 63 may be a flash memory or HDD (Hard Disk Drive). The memory 63 may store position information of guidance candidate objects, music, map information, and/or other information relating to navigational support.

The control section 64 may include a MPU (Micro Processing Unit). The control section 64 controls individual components of the portable navigational device 11 by executing a program stored in the program memory 67.

The control section 64 detects the current position of the portable navigational device 11 on the basis of the latitude and longitude supplied from the GPS module 62, and the direction the user's head is facing, as measured by the sensor module 32.

As described above, the current position of the portable navigational device 11 is detected by the control section 64 indicating the current position of the user who is using the portable navigational device 11 and the direction the user's head is facing.

The control section 64 also selects, based the current position of the user who is using the portable navigational device 11 and the direction the user's head is facing, an audio or haptic cue (as will be described in more detail below), indicating a characteristic of the path that the user who is using the portable navigational device 11 is looking at (head direction as measured by the sensor module 32).

Further, the control section 64, on the basis of the detected head direction and current position of the user who is using the portable navigational device 11, the control section 64 supplies audio commands to the DSP 65 so that the DSP 65 can generate the appropriate audio cue (as will be described in more detail below), which is transmitted to the headphone 12, earphones 202, or a speaker.

It is noted that the audio cue may be a change in the volume of the audio, to which the user is currently listening, to communicate information about the path that the user is facing, a synthesized voice to communicate information about the path that the user is facing, or a pre-designated sound, such as a noise or tone, to communicate information about the path that the user is facing.

It is further noted that the control section 64 could also supply commands to the DSP 65 so that the DSP 65 can generate the appropriate haptic cue.

The input section 66 may supply to the control section 64 keywords, commands, or the like corresponding to operations on a key input device such as the buttons 24 or an input voice inputted by a voice input device such as a microphone. The program memory 67 stores a program to be executed by the control section 64. The battery 68 supplies electric power to the respective components of the portable navigational device 11.

The control section 64 includes a current position detecting section 71, a head direction detecting section 72, and a target object selecting section 73.

The current position detecting section 71 detects the current position of the portable navigational device 11 on the basis of the latitude and longitude that are supplied from the GPS module 62 and supplies the detected current position to the target object selecting section 73.

The head direction detecting section 72 detects the head direction of the user on the basis of the direction of the earth's magnetic field that is measured by the sensor module 32, and supplies the detected head direction to the target object selecting section 73.

The target object selecting section 73 selects an audio cue (as will be described in more detail below), indicating a characteristic of the path that the user who is using the portable navigational device 11 at which the user is looking (head direction as measured by the sensor module 32). The target object selecting section 73 supplies audio commands to the DSP 65 so that the DSP 65 can generate the appropriate audio cue (as will be described in more detail below), which is transmitted to the headphone 12 or earphones 202.

Figure 4:
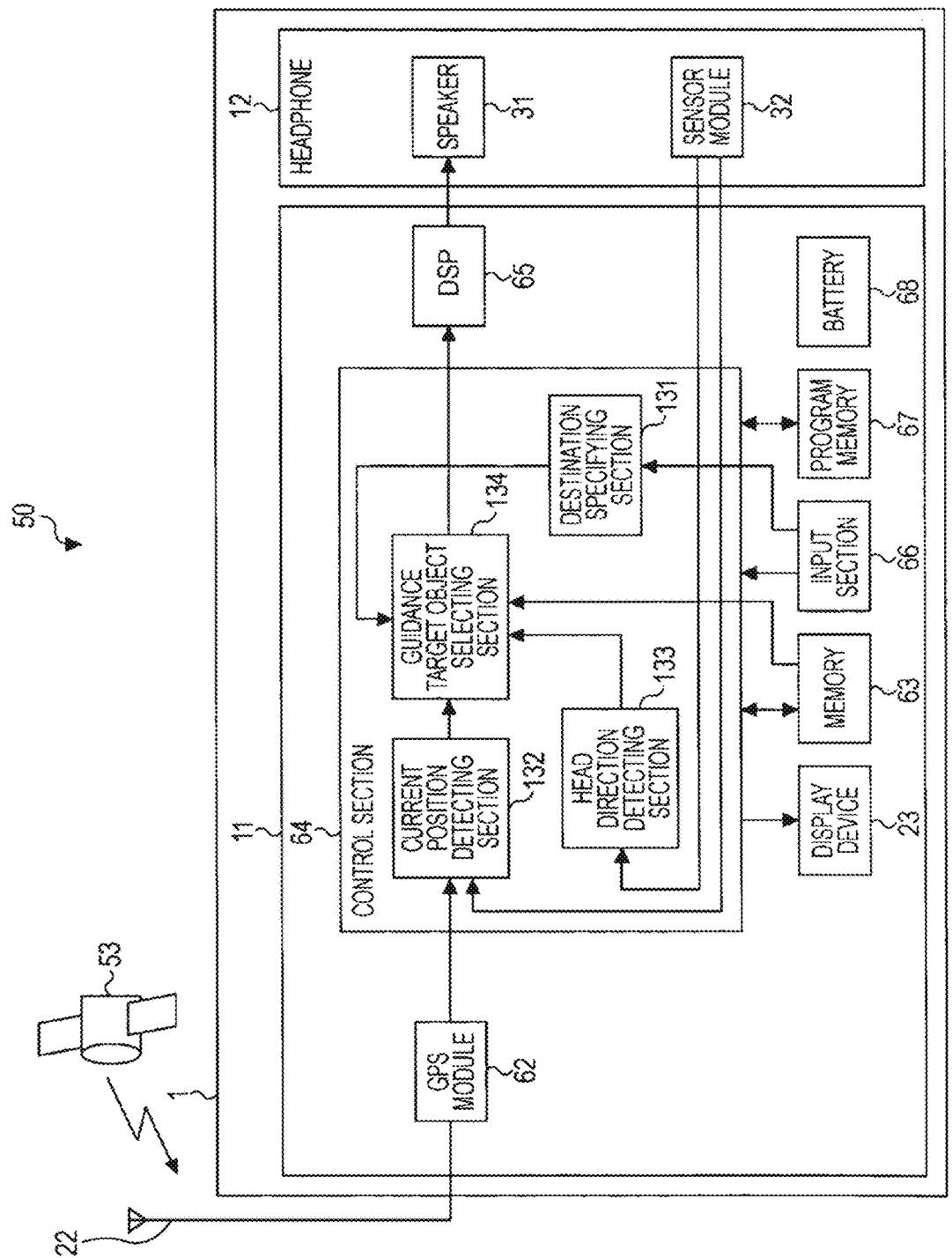
FIG. 4 illustrates another example of the configuration of an audio navigational system.

FIG. 4 illustrates another example of the configuration of an audio navigational system. As illustrated in FIG. 4, the wireless communication antenna 21 and communication module 61 shown in FIG. 3 are omitted.

Moreover, as illustrated in FIG. 4, a destination specifying section 131, a current position detecting section 132, and a head direction detecting section 133 are provided instead of the current position detecting section 71, head direction detecting section 72, and target object selecting section 73 of the control section 64 shown in FIG. 3.

In the example shown in FIG. 4, the portable navigational device 11 allows the user to specify a predetermined destination, and the portable navigational device 11 selects, at intersections along a route, alternative paths, from a set predetermined alternative paths, to a destination corresponding to the position of the user who is moving on the route and parameters inputted by the user, such as distance, time, elevation change, etc.

The portable navigational device 11 generates audio cues, through the speaker 31 of the headphone 12, in such a way that the user has guidance about the characteristics of each alternative path with respect to the parameters inputted by the user.

In FIG. 4, the memory 63 of the portable navigational device 11 may store map information in advance.

The destination specifying section 131 specifies a destination on the basis of a user's instruction made via the input section 66, for example, and supplies the specified destination to the target object selecting section 134.

The current position detecting section 132 detects the current position of the portable navigational device 11 on the basis of the latitude and longitude that are supplied from the GPS module 62.

The head direction detecting section 133 detects the head direction of the user on the basis of parameters measured by the sensor module 32, and supplies the detected head direction to the target object selecting section 134.

The target object selecting section 134 references the map information stored in the memory 63, for example, to select the alternative routes, from a set predetermined alternative paths, which fit the parameters inputted by the user, from the current position detected by the current position detecting section 132 to the destination specified by the destination specifying section 131.

Then, on the basis of the detected current position and the head direction supplied from the head direction detecting section 133, the target object selecting section 134 supplies data to the DSP 65 to cause an audio cue to be produced by the headphones 12 that informs the user as to how the alternative path that the user is seeing matches up with the parameters inputted by the user.

For example, if the alternative path best matches the parameters inputted by the user, the DSP 65 causes the volume of the audio (music) being produced by the headphones 12 to be at a normal volume level, the normal volume level being the volume that the user has selected for listening to the audio (music). If the path does not match the parameters inputted by the user, the DSP 65 may cause the volume of the audio (music) being produced by the headphones 12 to significantly decrease to a low volume level, the low volume level being no volume or barely audible. If the alternative path is not the best match but still respects the parameters inputted by the user, the DSP 65 may cause the volume of the audio (music) being produced by the headphones 12 to be a medium volume level, the medium volume level being a volume level between the normal volume level and the low volume level.

In another embodiment, if the alternative path best matches the parameters inputted by the user, the DSP 65 causes a synthesized voice to communicate information about the quality of the path that the user is facing, or a pre-designated sound, such as a noise or tone, to communicate information about the quality of the path that the user is facing. If the path does not match the parameters inputted by the user, the DSP 65 may cause a synthesized voice to communicate information about the quality of the path that the user is facing, or a pre-designated sound, such as a noise or tone, to communicate information about the path that the user is facing. If the alternative path is not the best match but still respects the parameters inputted by the user, the DSP 65 may cause a synthesized voice to communicate information about the quality of the path that the user is facing, or a pre-designated sound, such as a noise or tone, to communicate information about the path that the user is facing.

In a further embodiment, if the alternative path best matches the parameters inputted by the user, the DSP 65 causes a haptic cue to communicate information about the quality of the path that the user is facing. If the path does not match the parameters inputted by the user, the DSP 65 may cause a haptic cue to communicate information about the quality of the path that the user is facing. If the alternative path is not the best match but still respects the parameters inputted by the user, the DSP 65 may cause a haptic cue to communicate information about the quality of the path that the user is facing.

Figure 5:
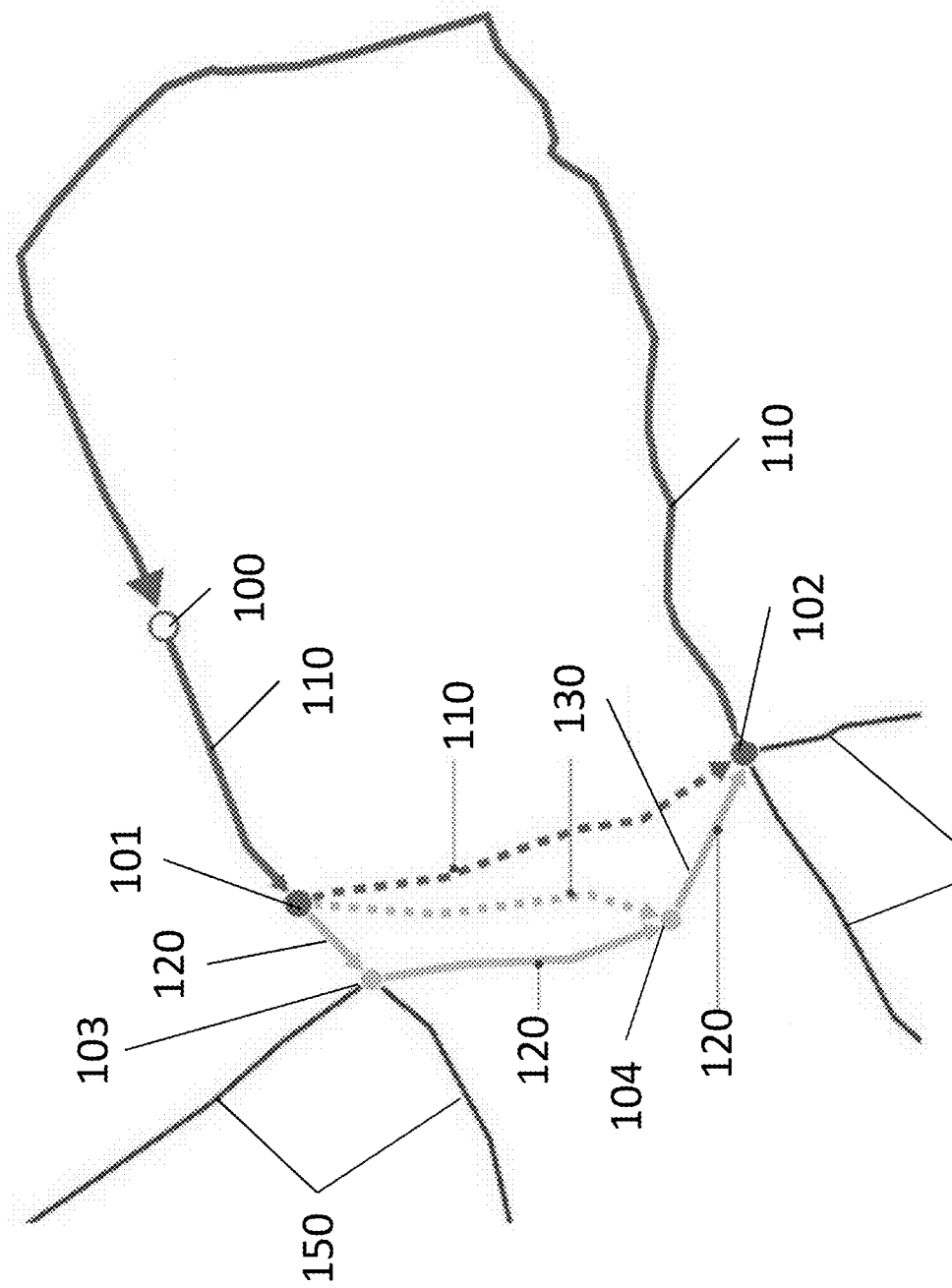
FIG. 5 illustrates an example of a pre-computed path and alternative paths.

FIG. 5 illustrates an example of a selected path and alternative paths. As illustrated in FIG. 5, a portable navigational device selects a path 110 for a user. The selected path 110 consists of starting point 100, travelling to intersection 101, travelling from intersection 101 to intersection 102, and travelling from intersection 102 back to starting point 100. It is noted that the path 110 may be computed by the portable navigational device.

As further illustrated in FIG. 5, paths 150 are paths outside the user's parameters and would be considered bad paths. Alternative path 120 consists of intersection 101, travelling from intersection 101 to intersection 103, travelling from intersection 103 to intersection 104, and travelling from intersection 104 to intersection 102. Alternative path 130 consists of intersection 101, travelling from intersection 101 to intersection 104, and travelling from intersection 104 to intersection 102.

With respect to FIG. 5, an initial tour (precomputed path 110) is first generated for a user defined target distance; the initial tour (precomputed path 110) is then augmented with possible alternative paths (alternative paths 120, 130) anywhere along the initial tour (precomputed path 110). It is noted that the alternative paths (alternative paths 120, 130) are paths that fit the user's requirements, and paths 150 are paths that do not fit the user's requirements.

These alternative paths (alternative paths 120, 130) may either be roughly equivalent in difficulty, e.g. length, to the original replaced path segment and otherwise of similar quality; constitute a significant simplification, e.g., shortcut; or constitute a pleasant extension of the original tour.

When exploring such a flexible tour, a user may take any combination of the proposed alternative paths. Ultimately, the tour may thus end up being significantly different, e.g. shorter or longer than the initially planned one (within a predefined range).

To enable the navigational support, the flexible tour is first analyzed and the navigation specific information is extracted. Each alternative path consists of a sequence of segments going through a sequence of intersections. The portable navigational device first extracts from the flexible tour; i.e. the initial tour and all the alternative paths, the list of intersections it contains, together with their locations (longitude and latitude).

For each intersection, the portable navigational device considers all the paths entering/leaving the intersection. Each of the entering/leaving paths is annotated with its direction (i.e. bearing) and initially labelled as good or bad depending on whether it is part of an alternative path or not. Good paths are those that are part of the alternative paths, i.e. that the user should follow when leaving this intersection; bad paths are those that are not part of the alternative paths and that the user should thus not follow. Note that there may be several good alternatives at each single intersection.

For each intersection, all the alternative paths crossing the intersection are considered: the good path options are annotated with information on how much distance, elevation etc. is added or removed, compared to the original tour path being replaced. This will allow the portable navigational device to highlight through audio or haptic cues, during navigation, those good path options that allow to increase or decrease the distance (or another user selected characteristic) by the most. With respect to the generated clues, the clues can be generated at three levels to distinguish between a best path, a bad path, and plausible paths. For example, three different volume levels can be used as cues, wherein a low volume level represents a bad path, a normal volume level represents a preferred path, and a medium volume level represents a less preferred path.

In FIG. 5, an original tour path 110, possible good alternative paths 120 and 130, and possible bad paths 150 are illustrated. In the example of FIG. 5, the user has requested, during the navigation, to increase the distance of the original tour path 110. To achieve that, the distance of the original tour path 110 is compared with the available alternative paths 120 and 130. The alternative path (120) that increases the distance the most is highlighted at intersection 101 among the others through sound modulation.

In other words, when the user is at or approaching intersection 101 and user's head direction is pointing at alternative path 120, the sound in the user's headphones will modulate; e.g., the volume will remain normal to indicate to the user that alternative path 120 is the best path.

Figure 6:
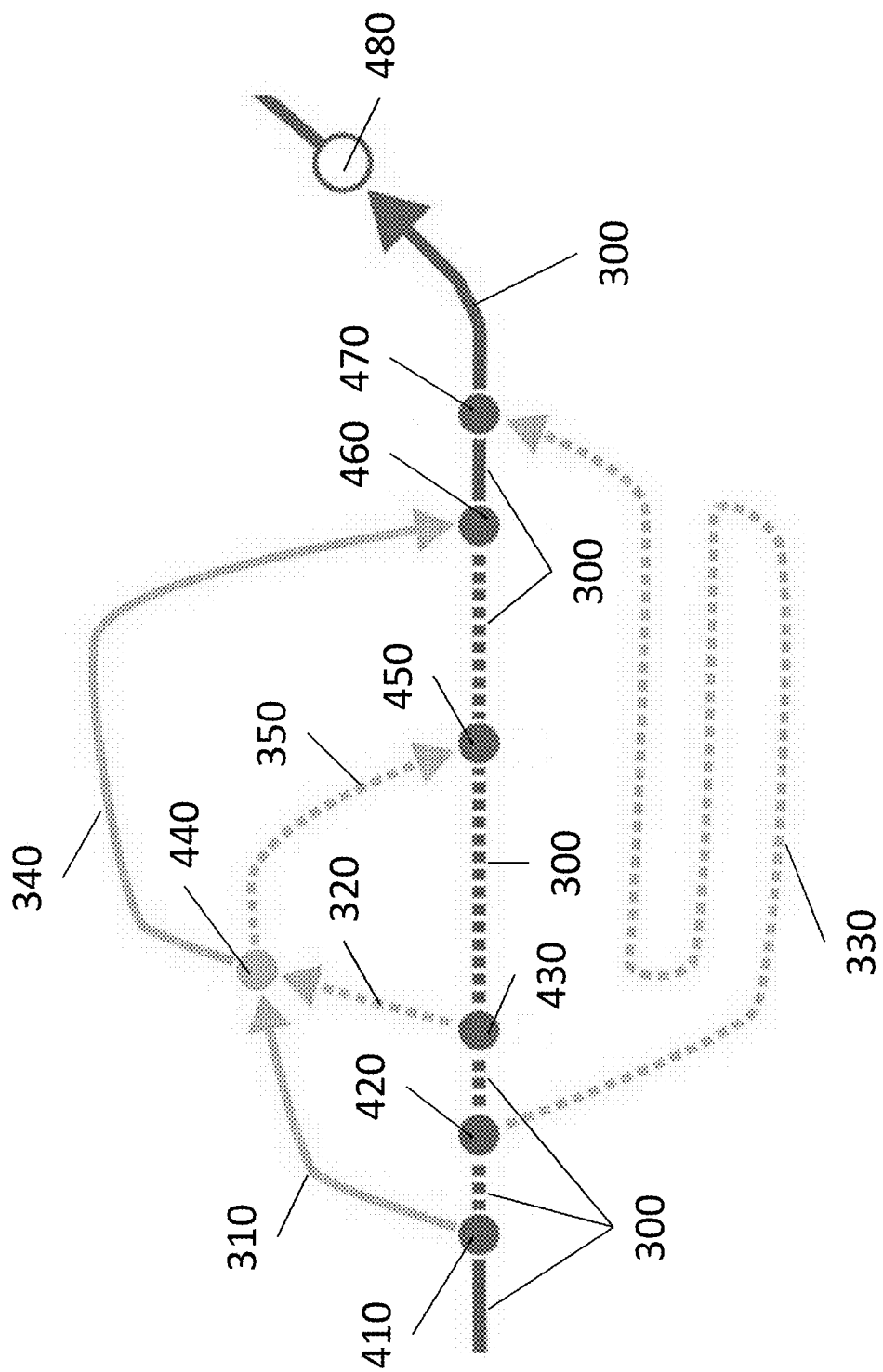
FIG. 6 illustrates another example of a pre-computed path and alternative paths.

FIG. 6 illustrates another example of a selected path and alternative paths. As illustrated in FIG. 6, a portable navigational device selects a path 300 for a user. The selected path 300 consists of travelling through intersection 410, travelling from intersection 410 to intersection 420, travelling from intersection 420 to intersection 430, travelling from intersection 430 to intersection 450, travelling from intersection 450 to intersection 460, travelling from intersection 460 to intersection 470, and travelling from intersection 470 to destination point 480. It is noted that the path 300 may be computed by the portable navigational device.

As further illustrated in FIG. 6, alternative path 310 consists of travelling from intersection 410 to intersection 440, alternative path 320 consists of travelling from intersection 430 to intersection 440, alternative path 340 consists of travelling from intersection 440 to intersection 460, alternative path 350 consists of travelling from intersection 440 to intersection 450, and alternative path 330 consists of travelling from intersection 420 to intersection 470.

As illustrated in FIG. 6, every proposed alternative path starts from the original path 410 and ends at destination point 480. When a user requests to increase or decrease the pre-selected characteristic, a portable navigational device compares the remainder of the available good paths in the upcoming intersection until destination point 480.

For example, when a user approaches the intersection 410 and has requested to increase the distance, the original path 300 is compared to the alternative path 310. This calculation will take place every time the user approaches an intersection with multiple good alternatives. Since alternative path 310 is longer, alternative path 310 will be highlighted through sound modulation.

At the next intersection 440, alternative path 350 is compared to the alternative path 340, which is longer. Thus, alternative path 340 will be highlighted through sound modulation. This allows the user create a reasonably longer tour, but not necessarily the longest available tour in terms of absolute distance.

Figure 7:
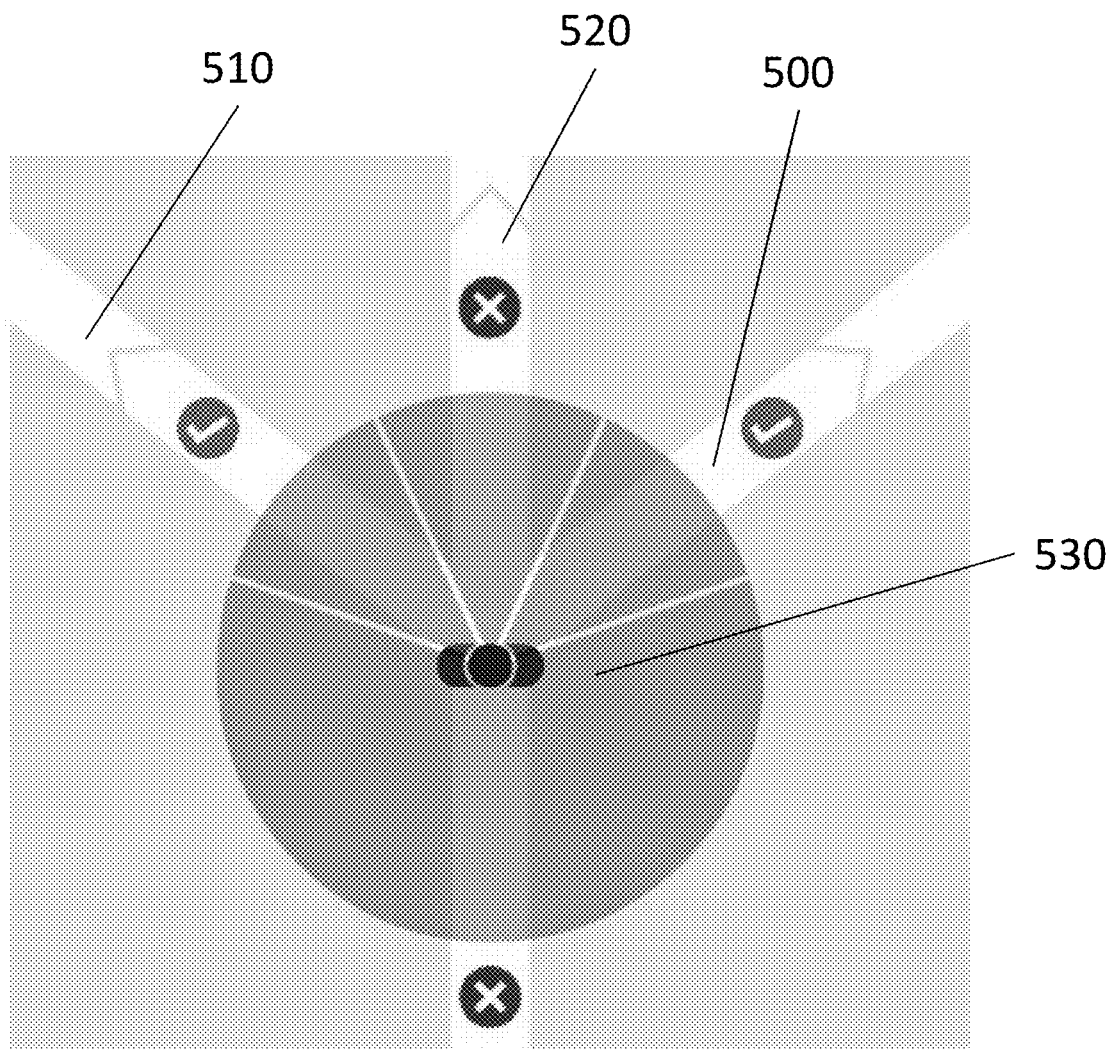
FIG. 7 illustrates an example of intersection navigation

FIG. 7 illustrates how the above-described navigational system supports navigation at an intersection. FIG. 7 shows an intersection 530 with the pre-computed vision angle range for each path (500, 510, and 520). Two paths (500 and 510) are good, one (520) is bad. If the user looks in the direction of a good path (500 or 510), the volume of the music, which the user may be listening to, remains normal. When the user looks in the direction of a bad path (520), the volume of the music, which the user is listening to, becomes barely audible.

In the case of a user requesting to increase or decrease the distance (or other characteristic of the path), the best option among the good paths (500 and 510) will be highlighted with a normal volume, the rest of the good paths (500 and 510) will have a medium volume and the bad path (520) would remain low.

Figure 8:
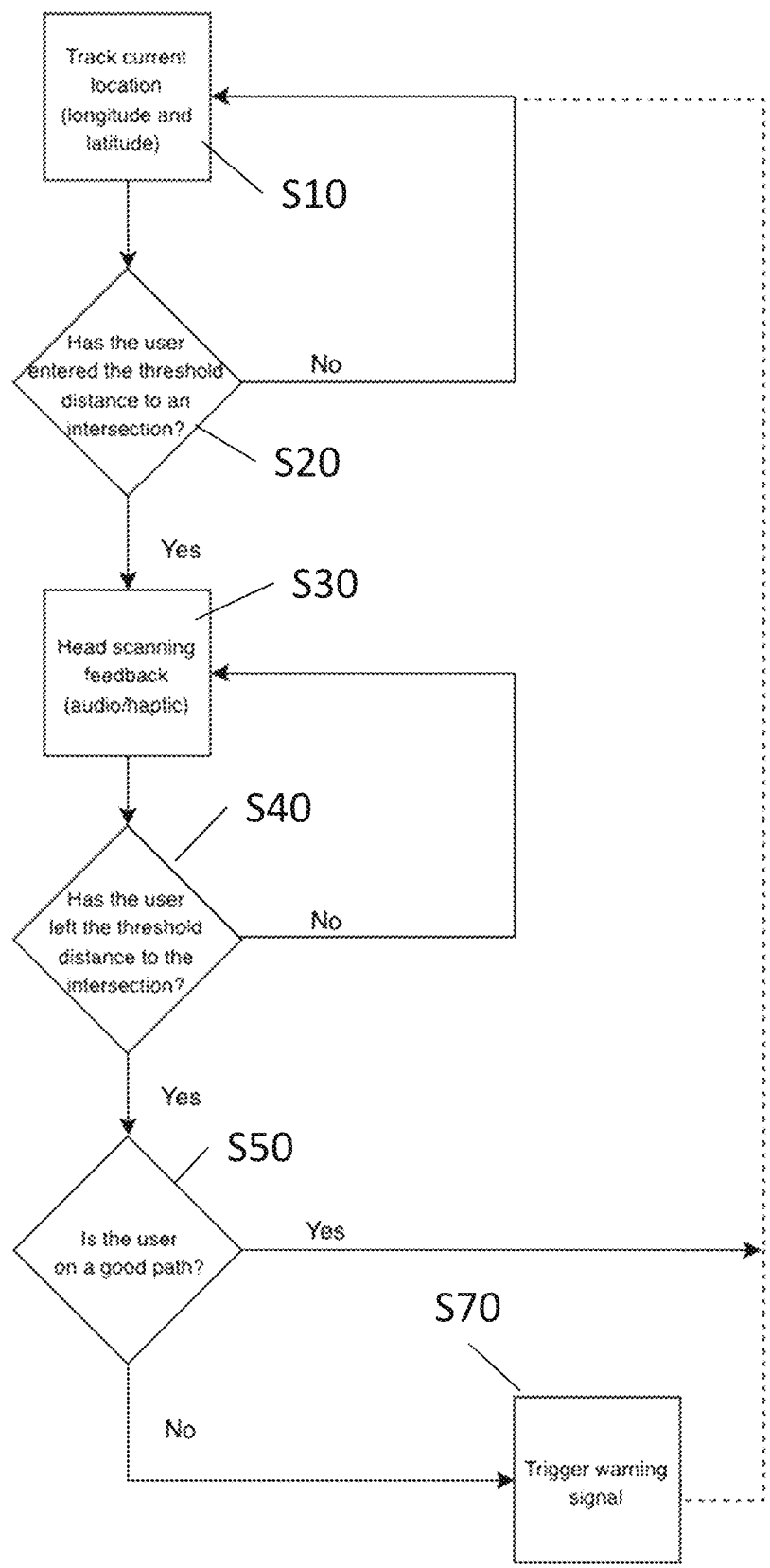
FIG. 8 illustrates a flowchart for a sensory discernible feedback navigational system.

FIG. 8 illustrates a flowchart for a sensory discernible feedback navigational system. As illustrated in FIG. 8, at step S10, the current location of the user is tracked (longitude and latitude). At step S20, it is determined if the user has entered into a threshold distance to an approaching intersection. If it is determined that the user has not entered into the threshold distance to the approaching intersection, the process continues to track the current location of the user, at step S10.

If it is determined that the user has entered into the threshold distance to the approaching intersection, step S30 creates sensory discernible (audio/haptic) feedback based upon the orientation of the user's head.

At step S40, it is determined if the user has left the threshold distance from the intersection. If it is determined that the user has not left the threshold distance from the intersection, the process continues to create sensory discernible (audio/haptic) feedback based upon the orientation of the user's head, at step S30.

If it is determined that the user has left the threshold distance from the intersection, step S50 determines if the user is on a good path. If it is determined that the user is on a good path, the process continues to track the current location of the user, at step S10. If it is determined that the user is not on a good path, step S70 issues sensory discernible (audio/haptic) warning feedback to the user that the user is leaving the intersection on a bad path.

Figure 9:
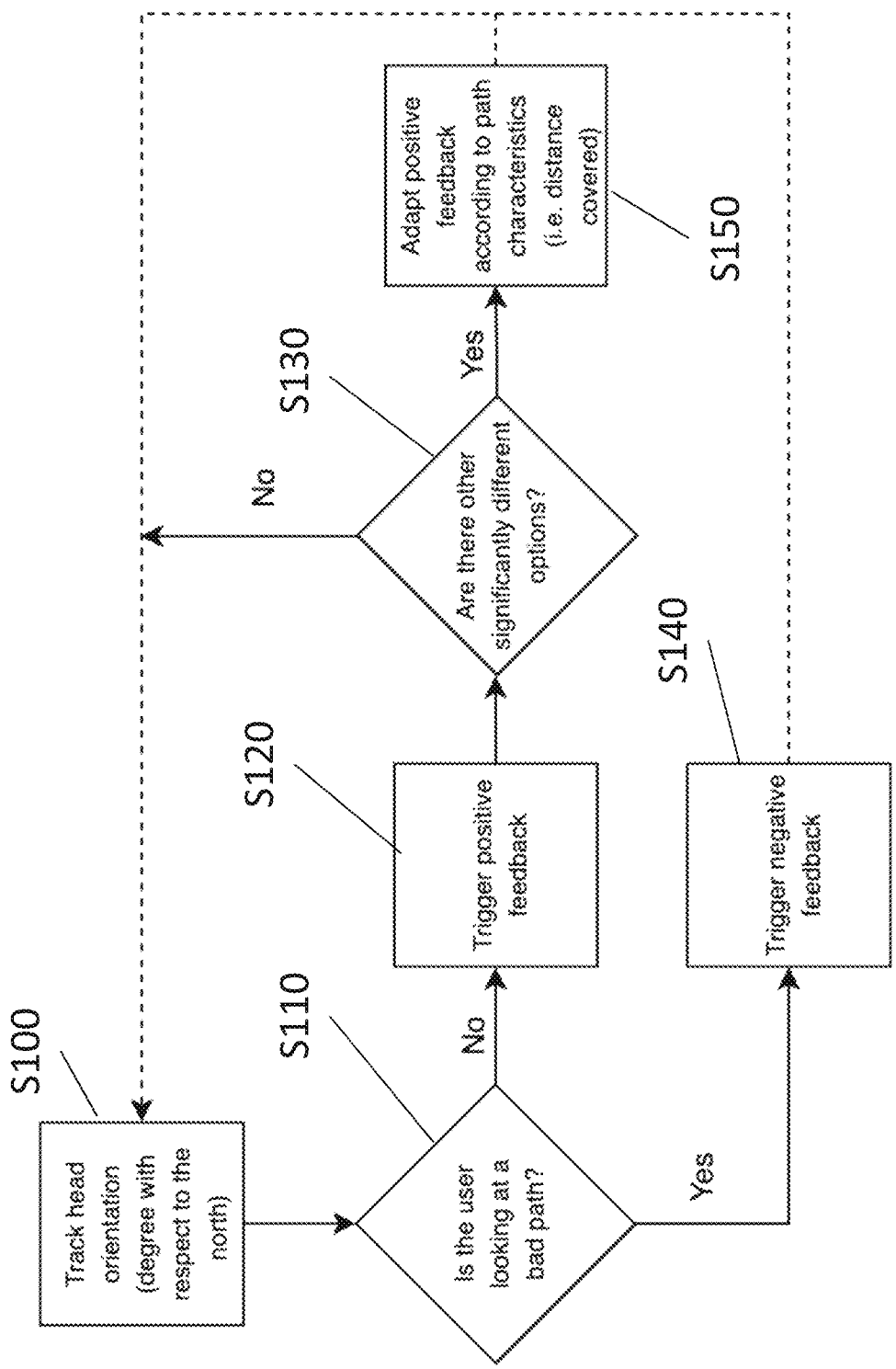
FIG. 9 illustrates a flowchart for head orientation tracking and sensory discernible feedback for a sensory discernible feedback navigational system.

FIG. 9 illustrates a flowchart for head orientation tracking and sensory discernible feedback for a sensory discernible feedback navigational system. As illustrated in FIG. 9, at step S100, the orientation of the user's head is determined. At step S110, it is determined if the user is looking at a good path. If it is determined that the user is not looking at a good path, step S140 issues sensory discernible (audio/haptic) negative feedback to the user that the user is on a bad path.

If it is determined that the user is looking at a good path, step S120 issues sensory discernible (audio/haptic) positive feedback to the user that the user is on a good path. At step S130, the sensory discernible feedback navigational system determines if there are any other significantly different path options.

If the sensory discernible feedback navigational system determines that there are no other significantly different path options, the process continues to track the orientation of the user's head, as step S100.

If the sensory discernible feedback navigational system determines that there are other significantly different path options, step S150 adapts the sensory discernible (audio/ haptic) positive feedback according to characteristics of the path corresponding to the orientation of the user's head.

Figure 10:
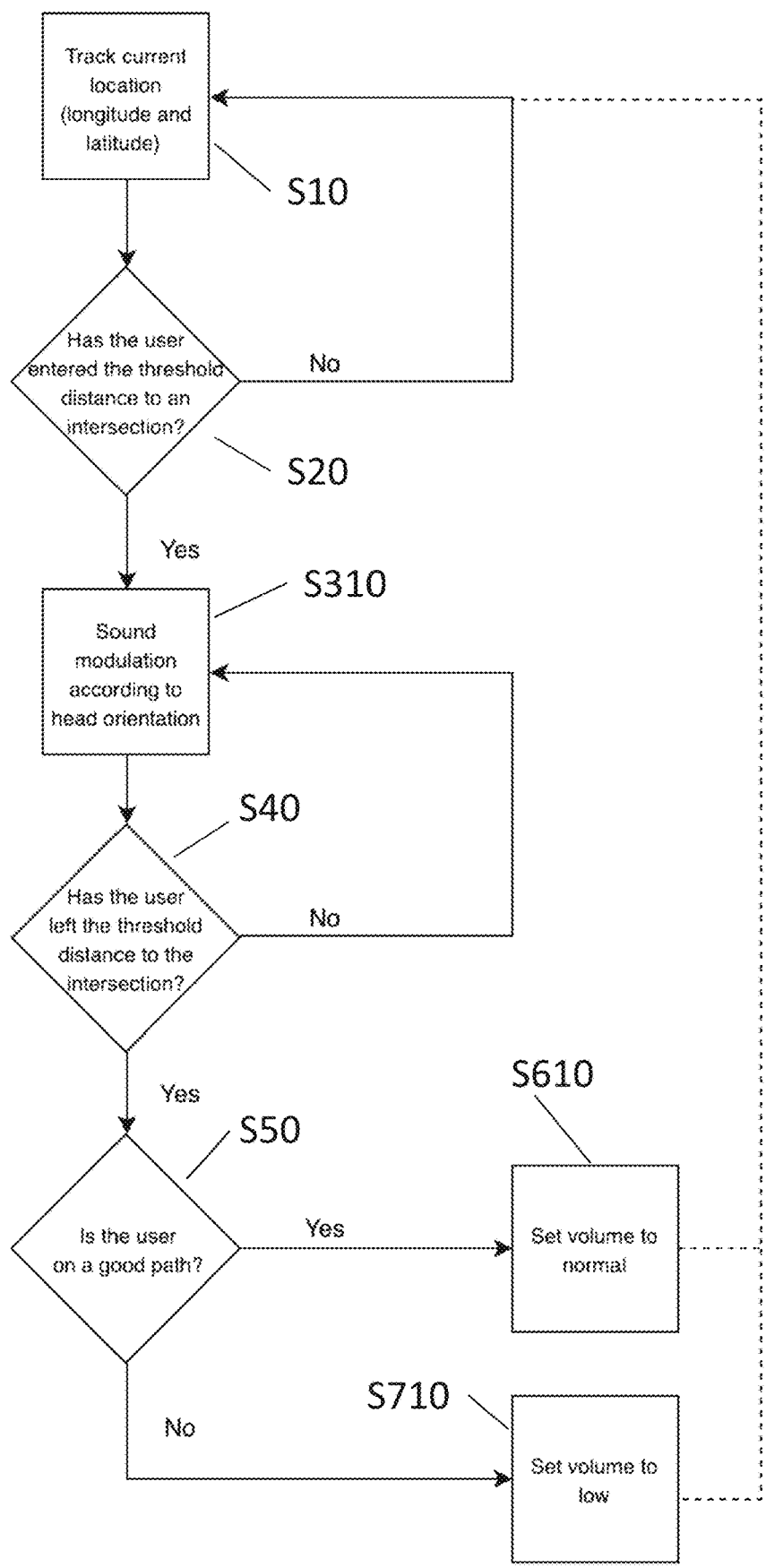
FIG. 10 illustrates a flowchart for an audio navigational system.

FIG. 10 illustrates a flowchart for the above-described audio navigational system. As illustrated in FIG. 10, at step S10, the current location of the user is tracked (longitude and latitude). At step S20, it is determined if the user has entered into a threshold distance to an approaching intersection. If it is determined that the user has not entered into the threshold distance to the approaching intersection, the process continues to track the current location of the user, at step S10.

If it is determined that the user has entered into the threshold distance to the approaching intersection, step S310 creates sound modulation based upon the orientation of the user's head.

At step S40, it is determined if the user has left the threshold distance from the intersection. If it is determined that the user has not left the threshold distance from the intersection, the process continues to create sound modulation based upon the orientation of the user's head, at step S310.

If it is determined that the user has left the threshold distance from the intersection, step S50 determines if the user is on a good path. If it is determined that the user is on a good path, step S610 sets volume of the audio to a normal volume. If it is determined that the user is not on a good path, step S710 sets volume of the audio to a low volume level, as a warning signal to the user that the user is leaving the intersection on a bad path. It is noted that a distinct audible warning signal could be generated as an alternative or in combination to the volume modulation.

Figure 11:
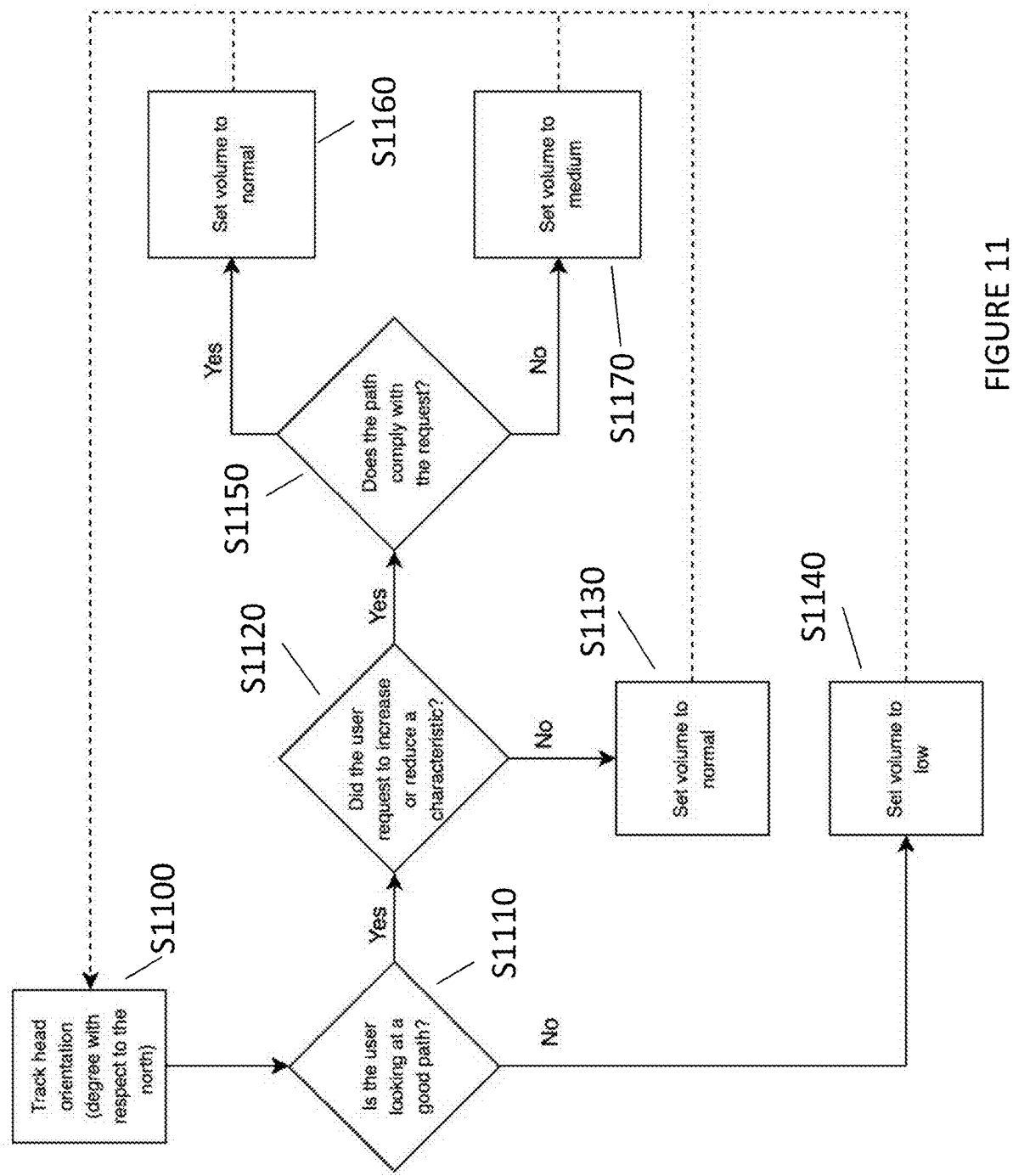
FIG. 11 illustrates a flowchart for head orientation tracking and sound modulation for an audio navigational system.

FIG. 11 illustrates a flowchart for head orientation tracking and sound modulation for the above-described audio navigational system. As illustrated in FIG. 11, at step S1100, the orientation of the user's head is determined. At step S1110, it is determined if the user is looking at a good path. If it is determined that the user is not looking at a good path, step S1140 sets the volume of the audio to low.

If it is determined that the user is looking at a good path, step S1120 determines if the user has requested an increase or a reduction characteristic. If it is determined that the user has not requested an increase or a reduction characteristic, step S1130 sets the volume of the audio to normal.

If it is determined that the user has requested an increase or a reduction characteristic, step S1150 determines if the path complies with the user's requested increase or reduction characteristic. If it is determined that the path complies with the user's requested increase or reduction characteristic, step S1160 sets the volume of the audio to normal. If it is determined that the path does not comply with the user's requested increase or reduction characteristic, step S1170 sets the volume of the audio to medium.

As described above, the portable navigational system tracks the user's location. When the user approaches an intersection; i.e. when the user enters a threshold distance to that intersection, the head orientation tracking and sound modulation mechanism is activated.

As long as the user remains within the threshold distance to the intersection, the head orientation tracking and sound modulation mechanism tracks the head orientation of the user; i.e., the degree to which the user turns the head with respect to the north. The portable navigational system adapts the sound volume to the head orientation: when the user is looking at a bad path, the portable navigational system sets the volume to low; otherwise, when the user looks at a good path, the volume is set to normal. Furthermore, on user request, the portable navigational system may also highlight particular good alternatives that match the user's current desires.

For example, in the beginning of the tour the user might feel motivated to exercise as much as possible and ask the portable navigational system to highlight options that will allow to increase the distance covered; later the user might get tired and ask for the shorter alternatives. In this case, the volume is further modulated to distinguish the best option(s) from the other good options, reducing the volume to medium for the good (but not best) options.

In the examples described above, the portable navigational system used distance as the path characteristic that can be reduced or increased on request. Nevertheless, other path characteristics could also be considered, for instance elevation gain, residential district, shopping district, cultural district, crime, etc. Any characteristic that is available or could be computed from the paths may be used.

The head orientation tracking and sound modulation loop continues as long as the user is within the threshold distance. When the user leaves this threshold distance (and thus the intersection), the head orientation tracking and sound modulation mechanism is deactivated and the location tracking takes over the control over the sound modulation.

The user's location co-ordinates (latitude and longitude) are used together with the location of the intersection to determine whether the user is leaving the intersection via a good path or not. If the user follows a bad path, the volume is set to low and set to normal when the user follows a good path. This volume remains constant until the user approaches another intersection, thus disregarding the movement and orientation of the user's head. When the user is not close to any intersection, the user is thus not disturbed with any volume changes when looking around and enjoying the environment.

The threshold distance around each intersection and the angles of each of its entering/leaving paths is pre-computed by the portable navigational system according to the closeness of the different paths, the angle between them and the size of the intersection.

The description above defines a system which is particularly suited for runners/pedestrians/cyclists, who enjoy music with their activity. Alternatively, another system is suited for runners/pedestrians/cyclists, who prefer to practice their activity without music and rather be immersed in the actual sound of the environment. In this system, the portable navigational system will play an audio snippet (or could also provide haptic feedback instead) to indicate bad paths.

Other cues may indicate good paths; however, another option is to not bother the runner/pedestrian/cyclist with (positive) cues as long as the user remains on a good path and to only provide cues (audio and/or haptic) when the user begins to travel along a bad path. In a haptic supported navigational system, the haptic cues could provide no vibration for a preferred path, a gentle vibration for a less preferred path, and a longer robust vibration for a bad path.

Additionally, the user can ask for confirmation that the user is on a good path at any time to reassure the user that the user is not lost. If the user requests to highlight paths that comply with a certain characteristic, this can be conveyed adjusting the sound volume of the snippets.

These cues could be played on a device carried by the user, such as smartphone or smartwatch, or even through bone conduction headphones, which would allow the user to enjoy the ambient sound while clearly receiving the sound cues about the path. Furthermore, the head orientation sensor could easily be fixed or integrated in the headphones.

It is noted that an additional audio or haptic alert may be added to inform and prepare the user when the user is about to approach a crucial intersection; i.e., when several good options are available at that intersection that are significantly different.

A method, using a micro-processor, an input device, and a sensory discernible output device, for providing navigation related sensory discernible feedback to a user traversing a route includes (a) mapping, using the micro-processor, an initial route for a user to traverse, the initial route having a starting point, a destination point, paths, and intersections; (b) determining, using the micro-processor, a current location of the user; (c) inputting, through the input device, a route characteristic change of the initial route; (d) determining, using the micro-processor, if the current location of the user is within a predetermined distance of an intersection; (e) determining, using the micro-processor, possible paths associated with the intersection for the user to traverse when it is determined that the current location of the user is within the predetermined distance of the intersection; (f) ranking, using the micro-processor, the determined possible paths based upon the initial route and the inputted route characteristic change; (g) determining, using the micro-processor, a head direction of the user when it is determined that the current location of the user is within the predetermined distance of the intersection; (h) determining, using the micro-processor, which determined possible path corresponds to the determined head direction of the user; and (i) providing, using the sensory discernible output device, a sensory discernible feedback to the user based upon the ranking of the determined possible path corresponding to the determined head direction of the user.

The sensory discernible feedback may be an audio based cue. The sensory discernible feedback may be a haptic based cue.

The providing of the audio based cue may be a change in a volume of audio being produced by a speaker. The providing of the audio based cue may be a synthesized voice to communicate information about the possible path corresponding to the determined head direction of the user. The providing of the audio based cue may be a pre-designated sound to communicate information about the possible path corresponding to the determined head direction of the user.

The providing of the audio based cue keeping the volume of audio being produced by a speaker normal to indicate that the path corresponding to the head direction of the user may be a desirable path for the user to traverse and decreases the volume of the audio being produced by the speaker to indicate that the path corresponding to the head direction of the user is a less desirable path for the user to traverse.

The providing of the audio based cue may be continuous and dynamic as a user's head changes direction when the current location of the user is within the predetermined distance of the intersection. The providing of the audio based cue may cease when the current location of the user is outside the predetermined distance of the intersection.

The method may provide an audio based warning signal when the current location of the user indicates that the user is leaving the intersection and the path corresponding to the head direction of the user is a bad path. The providing of the haptic based cue may be a change in an intensity or frequency of vibrations being produced by a vibro-tactile generating device.

The providing of the haptic based cue may be continuous and dynamic as a user's head changes direction when the current location of the user is within the predetermined distance of the intersection. The providing of the haptic based cue may cease when the current location of the user is outside the predetermined distance of the intersection.

The method may include provide a haptic based warning signal when the current location of the user indicates that the user is leaving the intersection and the path corresponding to the head direction of the user is a bad path.

A portable navigational device includes a user interface for enabling user input; a microprocessor; a global positioning signal receiver; a sensor; and a sensory discernible output device for providing navigation related sensory discernible feedback to a user traversing a route; the microprocessor mapping, in response to input from the user interface, an initial route for a user to traverse, the initial route having a starting point, a destination point, paths, and intersections; the microprocessor, in response to data received from the global positioning signal receiver, determining a current location of the user; the user interface receiving a route characteristic change of the initial route corresponding to input from the user; the microprocessor determining if the current location of the user is within a predetermined distance of an intersection; the microprocessor determining possible paths associated with the intersection for the user to traverse when the microprocessor determines that the current location of the user is within the predetermined distance of the intersection; the microprocessor ranking the determined possible paths based upon the initial route and the inputted route characteristic change; the microprocessor, based upon data received from the sensor, determining a head direction of the user when the microprocessor determines that the current location of the user is within the predetermined distance of the intersection; the microprocessor determining which determined possible path corresponds to the determined head direction of the user; the microprocessor causing the sensory discernible output device to provide a sensory discernible feedback to the user based upon the ranking of the determined possible path corresponding to the determined head direction of the user.

The sensory discernible feedback may be an audio based cue. The sensory discernible feedback may be a haptic based cue. The audio based cue may be a change in a volume of audio being produced by a speaker.

The audio based cue may be keeping the volume of audio being produced by a speaker normal to indicate that the path corresponding to the head direction of the user is a desirable path for the user to traverse and a decreasing of the volume of the audio being produced by the speaker to indicate that the path corresponding to the head direction of the user is a less desirable path for the user to traverse.

The audio based cue may be a synthesized voice to communicate information about the possible path corresponding to the determined head direction of the user.

The audio based cue may be a pre-designated sound to communicate information about the possible path corresponding to the determined head direction of the user. The audio based cue nay be continuous and dynamic as a user's head changes direction when the current location of the user is within the predetermined distance of the intersection.

The audio based cue may cease when the current location of the user is outside the predetermined distance of the intersection. The microprocessor may cause the sensory discernible output device to provide an audio based warning signal when the current location of the user indicates that the user is leaving the intersection and the path corresponding to the head direction of the user is a bad path.

The haptic based cue may be a change in an intensity or frequency of vibrations being produced by a haptic device. The haptic based cue may be continuous and dynamic as a user's head changes direction when the current location of the user is within the predetermined distance of the intersection.

The haptic based cue may cease when the current location of the user is outside the predetermined distance of the intersection. The microprocessor may cause the sensory discernible output device to provide a haptic based warning signal when the current location of the user indicates that the user is leaving the intersection and the path corresponding to the head direction of the user is a bad path.

The sensor may sense changes in the Earth's magnetic field to determine head direction.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method, using a micro-processor, an input device, and a sensory discernible output device, for providing navigation related sensory discernible feedback to a user traversing a route, comprising:
   (a) mapping, using the micro-processor, an initial route for a user to traverse, the initial route having a starting point, a destination point, paths, and intersections;
   (b) determining, using the micro-processor, a current location of the user;
   (c) inputting, through the input device, a route characteristic change of the initial route;
   (d) determining, using the micro-processor, if the current location of the user is within a predetermined distance of an intersection;
   (e) determining, using the micro-processor, possible paths associated with the intersection for the user to traverse when it is determined that the current location of the user is within the predetermined distance of the intersection;
   (f) ranking, using the micro-processor, the determined possible paths based upon the initial route and the inputted route characteristic change;
   (g) determining, using the micro-processor, a head direction of the user when it is determined that the current location of the user is within the predetermined distance of the intersection;
   (h) determining, using the micro-processor, which determined possible path corresponds to the determined head direction of the user; and
   (i) providing, using the sensory discernible output device, a sensory discernible feedback to the user based upon the ranking of the determined possible path corresponding to the determined head direction of the user.

2. The method as claimed in claim 1, wherein the sensory discernible feedback is an audio based cue.

3. The method as claimed in claim 1, wherein the sensory discernible feedback is a haptic based cue.

4. The method as claimed in claim 2, wherein the providing of the audio based cue is a change in a volume of audio being produced by a speaker.

5. The method as claimed in claim 2, wherein the providing of the audio based cue is a synthesized voice to communicate information about the possible path corresponding to the determined head direction of the user.

6. The method as claimed in claim 2, wherein the providing of the audio based cue is a pre-designated sound to communicate information about the possible path corresponding to the determined head direction of the user.

7. The method as claimed in claim 4, wherein the providing of the audio based cue keeping the volume of audio being produced by a speaker normal to indicate that the path corresponding to the head direction of the user is a desirable path for the user to traverse and decreases the volume of the audio being produced by the speaker to indicate that the path corresponding to the head direction of the user is a less desirable path for the user to traverse.

8. The method as claimed in claim 2, wherein the providing of the audio based cue is continuous and dynamic as a user's head changes direction when the current location of the user is within the predetermined distance of the intersection.

9. The method as claimed in claim 2, wherein the providing of the audio based cue ceases when the current location of the user is outside the predetermined distance of the intersection.

10. The method as claimed in claim 2, further comprising:
    (j) providing of an audio based warning signal when the current location of the user indicates that the user is leaving the intersection and the path corresponding to the head direction of the user is a bad path.

11. The method as claimed in claim 3, wherein the providing of the haptic based cue is a change in an intensity or frequency of vibrations being produced by a vibro-tactile generating device.

12. The method as claimed in claim 3, wherein the providing of the haptic based cue is continuous and dynamic as a user's head changes direction when the current location of the user is within the predetermined distance of the intersection.

13. The method as claimed in claim 3, wherein the providing of the haptic based cue ceases when the current location of the user is outside the predetermined distance of the intersection.

14. The method as claimed in claim 3, further comprising:
    (j) providing of a haptic based warning signal when the current location of the user indicates that the user is leaving the intersection and the path corresponding to the head direction of the user is a bad path.

15. A portable navigational device, comprising:
    a user interface for enabling user input;
    a microprocessor;
    a global positioning signal receiver;
    a sensor; and
    a sensory discernible output device for providing navigation related sensory discernible feedback to a user traversing a route;
    said microprocessor mapping, in response to input from said user interface, an initial route for a user to traverse, the initial route having a starting point, a destination point, paths, and intersections;
    said microprocessor, in response to data received from said global positioning signal receiver, determining a current location of the user;
    said user interface receiving a route characteristic change of the initial route corresponding to input from the user;
    said microprocessor determining if the current location of the user is within a predetermined distance of an intersection;

said microprocessor determining possible paths associated with the intersection for the user to traverse when said microprocessor determines that the current location of the user is within the predetermined distance of the intersection;

said microprocessor ranking the determined possible paths based upon the initial route and the inputted route characteristic change;

said microprocessor, based upon data received from said sensor, determining a head direction of the user when said microprocessor determines that the current location of the user is within the predetermined distance of the intersection;

said microprocessor determining which determined possible path corresponds to the determined head direction of the user;

said microprocessor causing said sensory discernible output device to provide a sensory discernible feedback to the user based upon the ranking of the determined possible path corresponding to the determined head direction of the user.

16. The portable navigational device as claimed in claim 15, wherein said sensory discernible feedback is an audio based cue.

17. The portable navigational device as claimed in claim 15, wherein said sensory discernible feedback is a haptic based cue.

18. The portable navigational device as claimed in claim 16, wherein said audio based cue is a change in a volume of audio being produced by a speaker.

19. The portable navigational device as claimed in claim 18, wherein said audio based cue is keeping the volume of audio being produced by a speaker normal to indicate that the path corresponding to the head direction of the user is a desirable path for the user to traverse and a decreasing of the volume of the audio being produced by the speaker to indicate that the path corresponding to the head direction of the user is a less desirable path for the user to traverse.

20. The portable navigational device as claimed in claim 16, wherein said audio based cue is a synthesized voice to communicate information about the possible path corresponding to the determined head direction of the user.

21. The portable navigational device as claimed in claim 16, wherein said audio based cue is a pre-designated sound to communicate information about the possible path corresponding to the determined head direction of the user.

22. The portable navigational device as claimed in claim 16, wherein said audio based cue is continuous and dynamic as a user's head changes direction when the current location of the user is within the predetermined distance of the intersection.

23. The portable navigational device as claimed in claim 16, wherein said audio based cue ceases when the current location of the user is outside the predetermined distance of the intersection.

24. The portable navigational device as claimed in claim 16, wherein said microprocessor causes said sensory discernible output device to provide an audio based warning signal when the current location of the user indicates that the user is leaving the intersection and the path corresponding to the head direction of the user is a bad path.

25. The portable navigational device as claimed in claim 17, wherein said haptic based cue is a change in an intensity or frequency of vibrations being produced by a haptic device.

26. The portable navigational device as claimed in claim 17, wherein said haptic based cue is continuous and dynamic as a user's head changes direction when the current location of the user is within the predetermined distance of the intersection.

27. The portable navigational device as claimed in claim 17, wherein said haptic based cue ceases when the current location of the user is outside the predetermined distance of the intersection.

28. The portable navigational device as claimed in claim 16, wherein said microprocessor causes said sensory discernible output device to provide a haptic based warning signal when the current location of the user indicates that the user is leaving the intersection and the path corresponding to the head direction of the user is a bad path.

29. The portable navigational device as claimed in claim 15, wherein said sensor senses changes in the Earth's magnetic field to determine head direction.

* * * * *